US012430491B1

(12) United States Patent
Long et al.

(10) Patent No.: US 12,430,491 B1
(45) Date of Patent: Sep. 30, 2025

(54) GRAPHICAL USER INTERFACE FOR SYNTAX AND POLICY COMPLIANCE REVIEW

(71) Applicant: ConductorAI Corporation, New York, NY (US)

(72) Inventors: Zachary Long, New York, NY (US); Benjamin Fichter, Biddeford, ME (US); Eric Schwartz, Brooklyn, NY (US); Jason Cardinale, New York, NY (US); Vincent Le, New York, NY (US); Gautam Mekkat, Poughkeepsie, NY (US); Rami Pellumbi, New York, NY (US); Jordan Gallivan, St. Augustine, FL (US); Jessica Shu, New York, NY (US)

(73) Assignee: ConductorAI Corporation, New York, NY (US)

( * ) Notice: Subject to any disclaimer, the term of this patent is extended or adjusted under 35 U.S.C. 154(b) by 0 days.

(21) Appl. No.: 18/987,388

(22) Filed: Dec. 19, 2024

(51) Int. Cl.
| | |
|---|---|
| *G06F 40/289* | (2020.01) |
| *G06F 3/0486* | (2013.01) |
| *G06F 16/34* | (2019.01) |
| *G06F 40/106* | (2020.01) |
| *G06F 40/166* | (2020.01) |

(52) U.S. Cl.
CPC .......... *G06F 40/106* (2020.01); *G06F 3/0486* (2013.01); *G06F 16/345* (2019.01); *G06F 40/166* (2020.01)

(58) Field of Classification Search
CPC .... G06F 40/106; G06F 3/0486; G06F 16/345; G06F 40/166
See application file for complete search history.

(56) References Cited

U.S. PATENT DOCUMENTS

| | | | |
|---|---|---|---|
| 7,725,499 B1 * | 5/2010 | von Lepel | G06Q 30/02 707/811 |
| 8,775,160 B1 * | 7/2014 | Roizen | G06F 16/3344 704/10 |
| 12,094,018 B1 * | 9/2024 | O'Malley | G06Q 50/184 |
| 12,182,539 B1 * | 12/2024 | Myers | G06F 8/77 |

(Continued)

FOREIGN PATENT DOCUMENTS

| | | | | |
|---|---|---|---|---|
| CN | 113130026 A | * | 7/2021 | G06F 40/166 |
| CN | 114902229 A | * | 8/2022 | G06F 40/16 |

(Continued)

*Primary Examiner* — Hassan Mrabi
(74) *Attorney, Agent, or Firm* — Scale LLP

(57) ABSTRACT

The present disclosure provides a document review and approval system comprising a user interface with a source selector, an objective definer, and a corpus selector for receiving source documents, user-defined objectives, and policy documents, respectively. An artificial intelligence engine processes the received inputs. Output interfaces include a syntax auditor for identifying and facilitating correction of syntax errors, a policy auditor for identifying non-compliance issues with policies, and a reporter for generating reports based on findings. The system enables efficient review and approval of documents for both syntax and policy compliance, utilizing artificial intelligence to process natural language inputs and generate outputs, including explanations for identified issues and natural language summaries in generated reports.

20 Claims, 8 Drawing Sheets

(56) References Cited

U.S. PATENT DOCUMENTS

| | | | | |
|---|---|---|---|---|
| 12,210,949 B1* | 1/2025 | Silver | | G06N 20/20 |
| 2006/0229896 A1* | 10/2006 | Rosen | | G06Q 10/1053 |
| | | | | 705/321 |
| 2006/0271526 A1* | 11/2006 | Charnock | | G06Q 30/02 |
| 2009/0254572 A1* | 10/2009 | Redlich | | G06Q 10/10 |
| 2010/0250497 A1* | 9/2010 | Redlich | | G06Q 10/06 |
| | | | | 707/661 |
| 2010/0332973 A1* | 12/2010 | Kloiber | | G06F 40/103 |
| | | | | 715/255 |
| 2016/0148118 A1* | 5/2016 | Venkateswarulu | | |
| | | | | G06F 16/2452 |
| | | | | 706/12 |
| 2018/0203921 A1* | 7/2018 | Privault | | G06F 16/3323 |
| 2020/0184005 A1* | 6/2020 | Wood | | G06F 40/253 |
| 2020/0184009 A1* | 6/2020 | Wood | | H04L 67/10 |
| 2020/0293604 A1* | 9/2020 | Nelson | | G06F 40/169 |
| 2020/0293608 A1* | 9/2020 | Nelson | | G06F 40/169 |
| 2020/0293616 A1* | 9/2020 | Nelson | | G06F 40/289 |
| 2020/0401574 A1* | 12/2020 | Sexton | | G06F 16/2358 |
| 2021/0319781 A1* | 10/2021 | Gullo | | G06F 40/166 |
| 2022/0237477 A1* | 7/2022 | Tamilselvam | | G06N 20/00 |
| 2022/0238103 A1* | 7/2022 | Madhusudhan | | G10L 15/1815 |
| 2022/0358238 A1* | 11/2022 | Bag | | G06V 30/414 |
| 2023/0359809 A1* | 11/2023 | Trese | | G06F 21/60 |
| 2024/0202221 A1* | 6/2024 | Siebel | | G06F 16/338 |
| 2024/0290168 A1* | 8/2024 | Goyal | | G06Q 50/34 |
| 2024/0378399 A1* | 11/2024 | Gandhi | | G06F 16/345 |
| 2024/0403563 A1* | 12/2024 | Bex, IV | | G06F 16/383 |
| 2024/0411982 A1* | 12/2024 | Malanga | | G06V 30/412 |
| 2025/0005828 A1* | 1/2025 | Levins | | G06Q 30/018 |
| 2025/0007870 A1* | 1/2025 | Kim | | G06F 21/31 |
| 2025/0045513 A1* | 2/2025 | Guberman | | G06F 40/166 |

FOREIGN PATENT DOCUMENTS

| | | | | |
|---|---|---|---|---|
| CN | 111612429 B | * | 12/2023 | G06Q 10/103 |
| CN | 117709335 A | * | 3/2024 | G06F 40/30 |
| CN | 117992115 A | * | 5/2024 | G06F 9/5027 |
| CN | 118260267 A | * | 6/2024 | G06F 11/1448 |
| CN | 118780251 A | * | 10/2024 | G06Q 10/103 |
| CN | 118822446 A | * | 10/2024 | G06F 16/2433 |
| CN | 119047432 A | * | 11/2024 | G06F 16/383 |
| CN | 119047450 A | * | 11/2024 | G06F 16/383 |
| EP | 3968146 B1 | * | 5/2024 | G05B 19/0426 |
| JP | 2001508883 A | * | 12/1997 | G09C 1/00 |
| KR | 20220000436 A | * | 1/2022 | G06N 3/0442 |
| WO | WO-0248824 A2 | * | 6/2002 | G06F 17/243 |
| WO | WO-2004068297 A2 | * | 8/2004 | G06Q 30/02 |
| WO | WO-2024201299 A1 | * | 10/2024 | A61K 31/4196 |
| WO | WO-2024238919 A1 | * | 11/2024 | G06N 20/00 |
| WO | WO-2024253782 A1 | * | 12/2024 | G06F 30/27 |
| WO | WO-2025024326 A2 | * | 1/2025 | G06F 40/166 |

\* cited by examiner

Select Source   Define Objectives   Review Syntax   Select Corpus   Review Policy   Generate Report

Secret Project Current Status

222
- Lorem ipsum dolor sit amet, consectetur.
- Phasellus vehicula, nulla sit amet tincidunt.
- ⚠ {Fermentum, sapien justo cursus libero, nec.
  Tincidunt arcu ligula nec urna.}

Pg. 4

Company Confidential / Proprietary

Secret Project 3-Mo Plan

222
- {Curabitur euismod, nisi eu facilisis vehicular.}
- Justo sapien tincidunt libero.
- Nec tincidunt arcu ligula nec urna.
- Curabitur euismod, nisi eu facilisis vehicular.

Pg. 7

Company Confidential / Proprietary

Findings — 220

> Page 4

⚠ *Lorem ipsum dolor sit amet, consectet adipiscing elit. Phasellus vehicula.*

> Page 7

⚠ *Curabitur euismod, nisi eu facilisis vehicula, justo sapien tincidunt libero.*

> Page 8 (1)
> Page 12 (3)
> Page 14 (2)

FIG. 2E

GRAPHICAL USER INTERFACE FOR SYNTAX AND POLICY COMPLIANCE REVIEW

FIELD OF INVENTION

The present disclosure relates to graphical user interfaces for document review and approval systems, and more particularly to a novel graphical user interface that interfaces with an artificial intelligence engine to facilitate syntax and policy compliance checking of documents.

BACKGROUND

The process of preparing and submitting applications for various purposes, such as disclosing sensitive information or grant proposals, often involves complex requirements that must be carefully followed. These requirements typically encompass both syntax and policy guidelines, which are crucial for the application's success and compliance with relevant regulations.

In the context of disclosing sensitive information, for example, government agencies and organizations must navigate an intricate process designed to protect sensitive information while facilitating necessary international cooperation. This process generally involves multiple steps, including document preparation and marking, initial review, submission to a designated approval authority, policy compliance checks, and coordination with other agencies when necessary. Throughout this process, attention to both syntax (e.g., proper classification markings and formatting) and policy (e.g., compliance with national disclosure policies and export regulations) is critical.

Similarly, when drafting proposals or other strategic documents, applicants must adhere to specific formatting guidelines while also ensuring their proposed work aligns with a company's or agency's policies and priorities. This dual focus on syntax and policy compliance is common across many types of application processes, including patent applications, regulatory filings, and academic submissions.

The current state of the art in document review and compliance checking is characterized by a fragmented approach that fails to address the complex needs of users who require both syntax and policy compliance in a single, integrated system. While there are numerous tools available for specific aspects of document review, such as spelling and grammar checkers for basic syntax issues, they fall short in providing a comprehensive solution that can handle the nuanced requirements of specialized application processes.

Existing solutions often lack the ability to customize syntax rules based on user-defined objectives, incorporate a corpus of policy documents against which to check compliance, or generate comprehensive reports about the review and approval process. This lack of integration forces users to rely on multiple tools and manual processes, leading to inefficiencies, increased risk of errors, and potential compliance issues.

Furthermore, while artificial intelligence and natural language processing technologies have made significant advancements in recent years, their application to the specific challenges of document review and approval processes remains limited. There is a need for novel graphical user interfaces that can leverage these technologies to provide a more intuitive, efficient, and comprehensive approach to syntax and policy compliance checking.

As the complexity of application processes continues to grow, along with the volume of documents that need to be reviewed and approved, there is an increasing demand for innovative solutions that can streamline these workflows while maintaining high standards of accuracy and compliance. Such solutions could potentially revolutionize how organizations handle document review and approval processes across various domains, from government agencies to academic institutions and private sector enterprises.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a document review and approval system is provided. The system includes a user interface comprising a source selector configured to receive one or more source documents, an objective definer configured to receive one or more user-defined objectives for document review, and a corpus selector configured to receive one or more policy documents. The system further includes an artificial intelligence engine configured to process the source documents, user-defined objectives, and policy documents. The system also includes output interfaces comprising a syntax auditor configured to identify and facilitate correction of one or more syntax errors in the source documents, a policy auditor configured to identify one or more non-compliance issues with policies, and a reporter configured to generate one or more reports based on findings of the syntax and/or policy auditors.

According to other aspects of the present disclosure, the document review and approval system may include one or more of the following features. The syntax auditor may be further configured to automatically correct the one or more identified syntax errors in the source documents. The policy auditor may be configured to identify the one or more non-compliance issues by comparing content of the source documents against the policy documents using natural language processing. The reporter may be configured to generate a summary memorandum based on the findings of the policy auditor. The reporter may be configured to customize report content based on the one or more user-defined objectives received through the objective definer and incorporate natural language summaries and explanations generated by the artificial intelligence engine. The corpus selector may be configured to semantically search across a database of policy documents to identify one or more relevant policy documents based on the user-defined objectives.

The user interface may further comprise a document presenter configured to display content of the one or more source documents alongside identified syntax errors and policy non-compliance issues. The document presenter may be configured to highlight portions of the one or more source documents corresponding to identified syntax errors and policy non-compliance issues. The artificial intelligence engine may comprise a large language model configured to process natural language inputs and generate natural language outputs. The large language model may be further configured to generate explanations for identified syntax errors and policy non-compliance issues. The user interface may further comprise a finding presenter configured to display one or more policy-related findings for the source documents. The corpus selector may be further configured to allow users to upload additional policy documents.

The artificial intelligence engine may be further configured to recommend one or more relevant policy documents based on the content of the one or more source documents and the one or more user-defined objectives. The artificial intelligence engine may be further configured to create an expert network by analyzing metadata from previously approved documents to identify patterns and relationships between document types, topics, and approvers. The system may be configured to support workflows involving multiple users based on their respective responsibilities in a review and approval process. The reporter may be further configured to generate approval stamps or markings and apply them directly to the one or more source documents to indicate their review status and/or approval.

The user interface may be configured to guide users through multiple stages of a review process, including selecting source documents, defining objectives, reviewing syntax, selecting a corpus, reviewing policy compliance, and generating reports. The user interface may further comprise a rule creation element configured to allow users to define one or more rules in plain language, and the artificial intelligence engine may process these one or more user-defined rules and incorporate them into one or more of the syntax auditor and policy auditor for document evaluation. The user interface may further comprise a finding presenter configured to display policy-related findings for the one or more source documents, the finding presenter including a finding selector configured to allow users to select one or more specific findings for inclusion in the one or more reports. The finding presenter may further include a finding remover element configured to allow users to remove selected findings from consideration before the reporter generates the one or more reports.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIG. 2E illustrates a user interface for reviewing policy compliance in a document, according to an embodiment.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The document review and approval system described herein provides a comprehensive solution for reviewing and approving documents in accordance with both syntax and policy requirements. This system may be particularly useful in environments where document compliance with specific formatting rules and policy guidelines is critical, such as in government agencies or highly regulated industries.

The system may include a user interface that allows users to interact with various components of a review process. In some cases, the user interface may comprise a source selector, which may enable users to input or select documents for review. The user interface may also include an objective definer, which may allow users to specify the goals or purposes of the document review. Additionally, the user interface may feature a corpus selector, which may permit users to choose and/or upload relevant policy documents against which the source documents will be evaluated.

The system may process the inputs provided through the user interface using advanced artificial intelligence techniques. This processing may involve analyzing the source documents, interpreting the user-defined objectives, and examining the selected policy documents to identify potential issues or areas of concern.

Following the analysis, the system may present its findings through various output interfaces. These output interfaces may include a syntax auditor, which may identify and help correct formatting or structural errors in the source documents. The output interfaces may also comprise a policy auditor, which may highlight areas where the content of the source documents may not comply with the specified policies. Furthermore, the output interfaces may include a reporter, which may generate summaries or detailed reports based on the findings of the syntax and policy audits.

By combining these various components, the document review and approval system may streamline the process of ensuring document compliance, potentially reducing the time and effort required for thorough document reviews while maintaining a high standard of accuracy and consistency.

Figure 1:
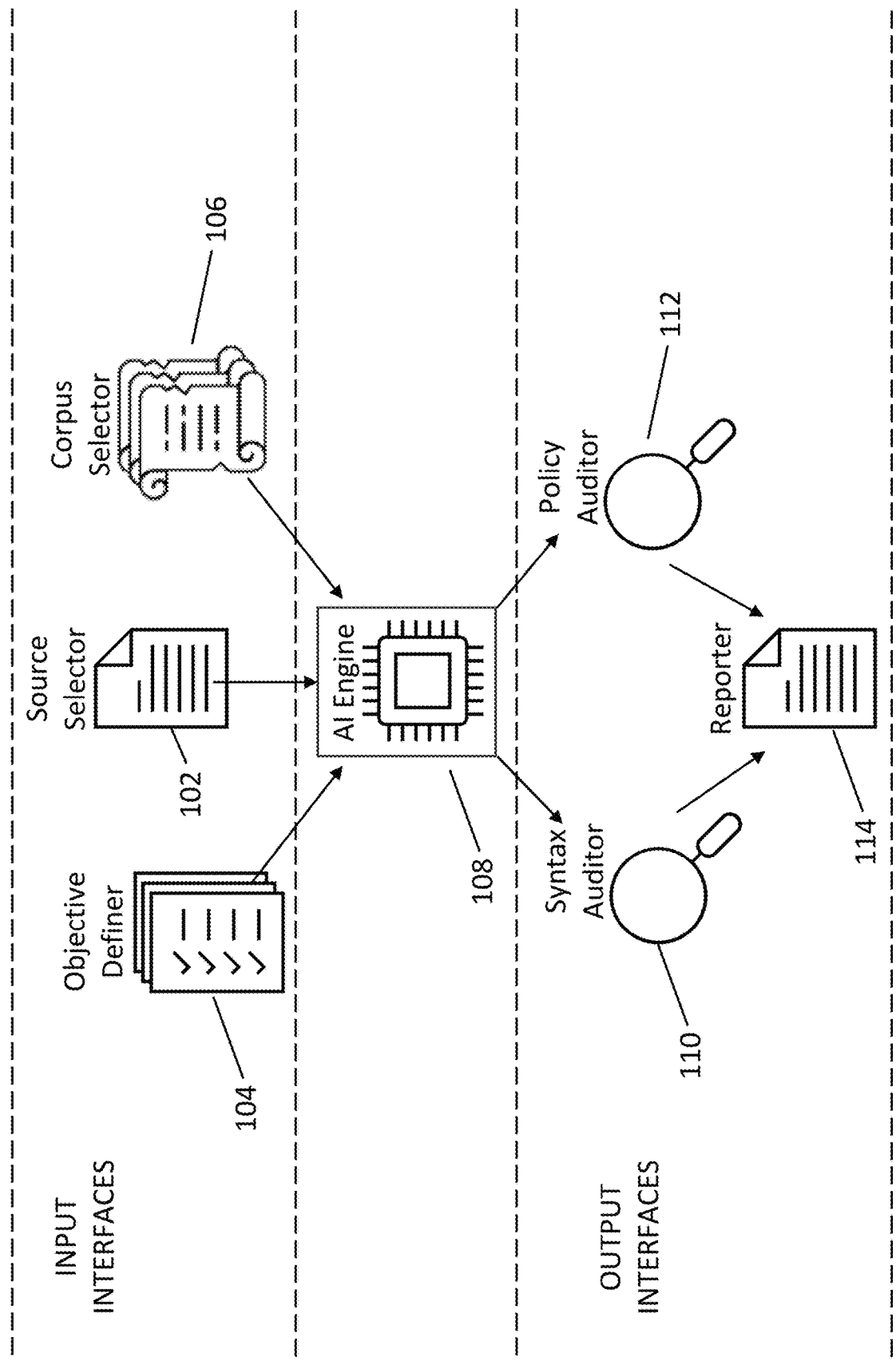
FIG. 1 illustrates a block diagram of a document review and approval system, according to aspects of the present disclosure.

FIG. 1 illustrates a block diagram of a document review and approval system in accordance with aspects of the present disclosure. The system may comprise three main sections: input interfaces, an artificial intelligence (AI) engine, and output interfaces.

The input interfaces may include a source selector 102, an objective definer 104, and a corpus selector 106. The source selector 102 may allow users to select or upload documents for processing. The objective definer 104 may enable users to define the objectives for their review request. The corpus selector 106 may permit users to search for and select relevant policies and/or policy documents.

At the center of the system may be the AI engine 108, which may process the inputs from the source selector 102, objective definer 104, and corpus selector 106. The AI engine 108 may perform analysis and generate outputs based on the provided inputs.

The output interfaces may consist of a syntax auditor 110, a policy auditor 112, and a reporter 114. The syntax auditor 110 may identify and help fix syntax errors in the source documents. The policy auditor 112 may identify non-compliance issues with policies. The reporter 114 may generate reports, summaries, or memorandums based on the findings of the syntax and policy auditors.

This structure may allow for a workflow that begins with document and objective input, proceeds through AI-powered analysis, and concludes with detailed auditing and reporting. The system may provide a comprehensive approach to document review and approval, integrating syntax checking, policy compliance, and reporting functionalities within a single platform.

Figure 2A:
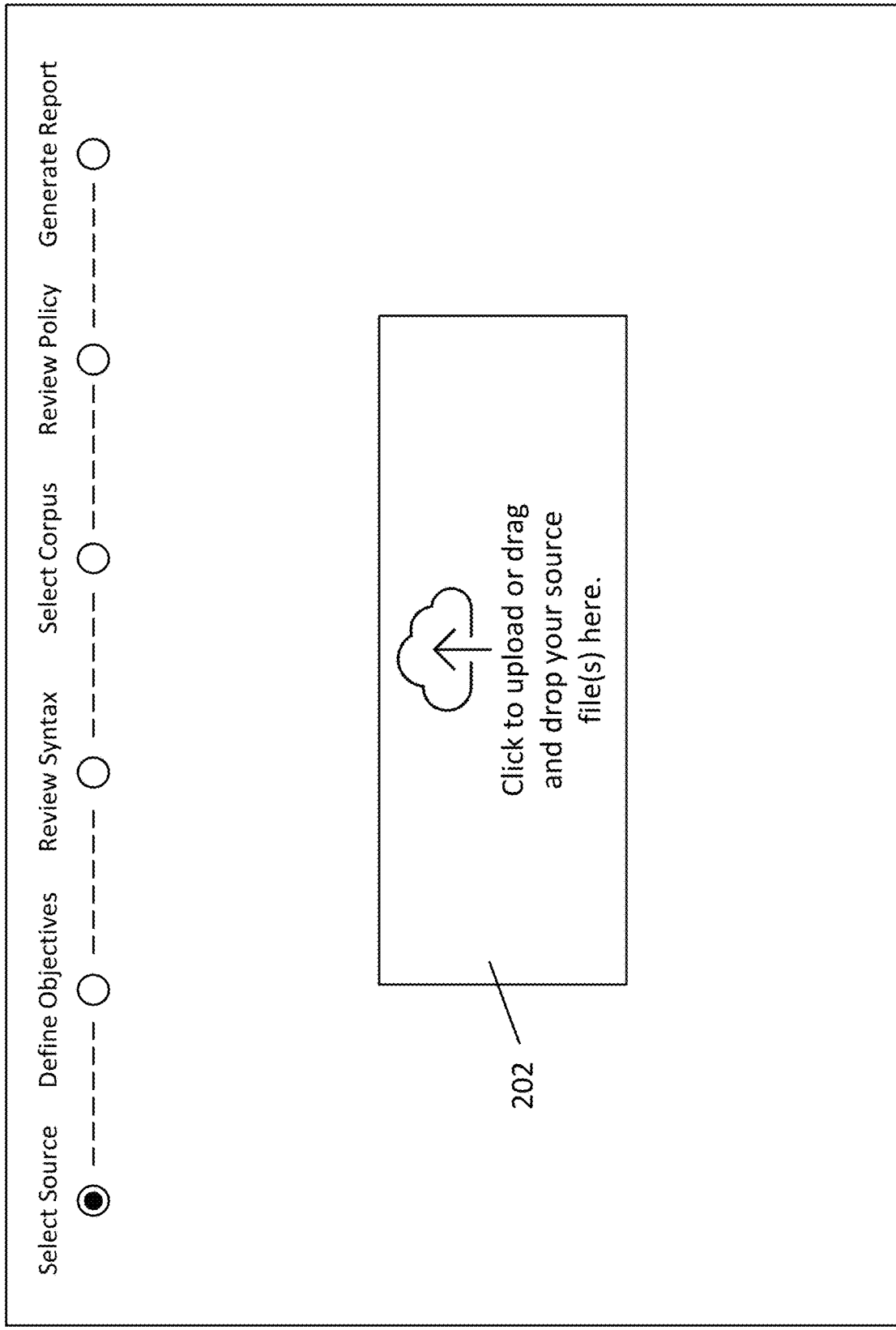
FIG. 2A illustrates a user interface for selecting a source document, according to an embodiment.

Embodiments of the document review and approval system may include a user interface 200 that integrates various components and guides users through the review process. FIG. 2A illustrates the user interface 200 displaying a workflow process with multiple steps, including "Select Source," "Define Objectives," "Review Syntax," "Select Corpus," "Review Policy," and "Generate Report."

The user interface 200 may guide users through different stages of the review process. In the initial stage, as shown in FIG. 2A, users may interact with the source selector element 202 to upload or select source documents for review. The source selector element 202 may provide options for clicking to upload or dragging and dropping files.

Figure 2B:
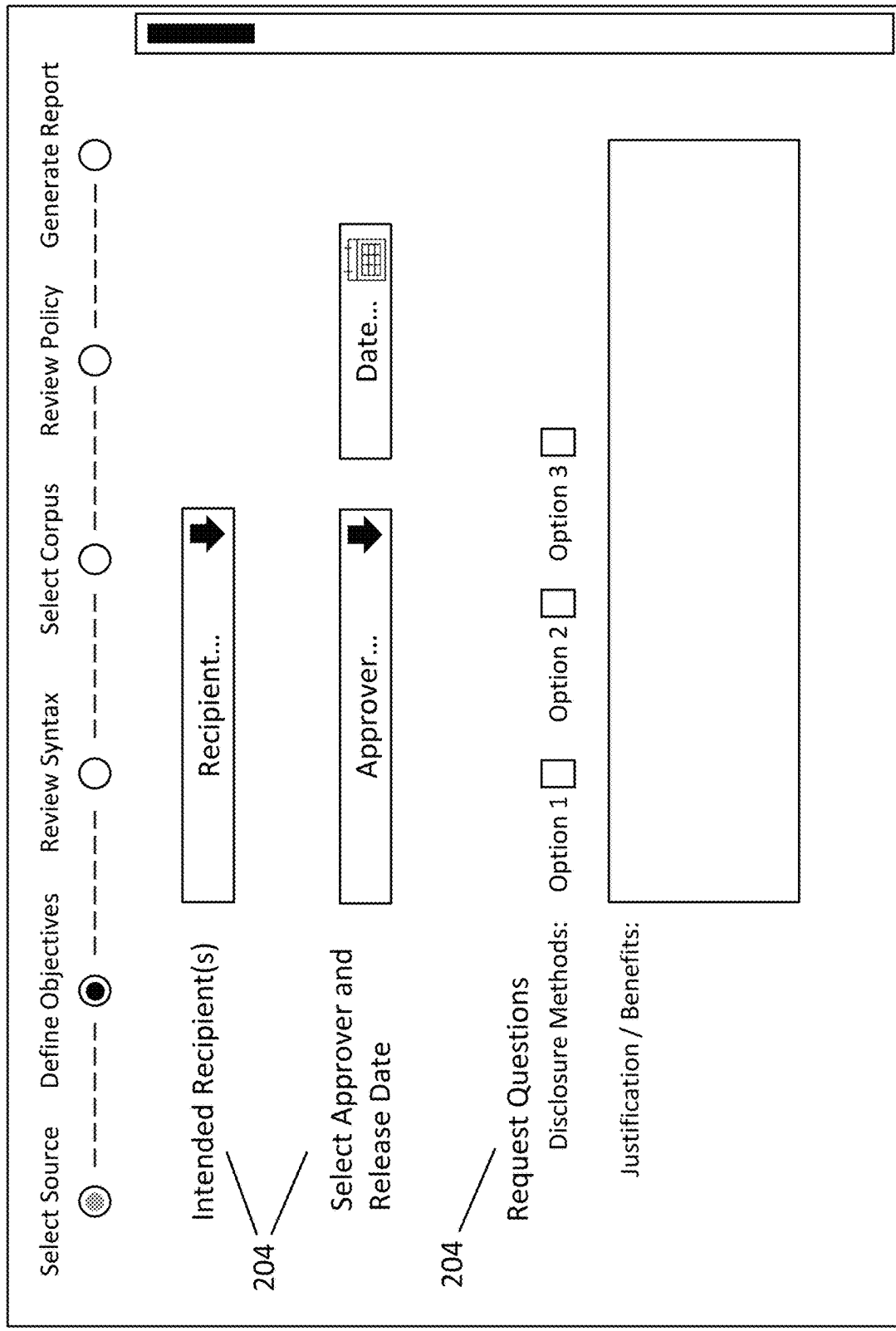
FIG. 2B illustrates a user interface for defining objectives in a document review system, according to an aspect of the present disclosure.

FIG. 2B illustrates the next stage where users may interact with the objective definer elements 204. The objective definer elements 204 may include dropdown menus, date pickers, checkboxes, text entry fields, and other input elements for users to define their review objectives.

Figure 2C:
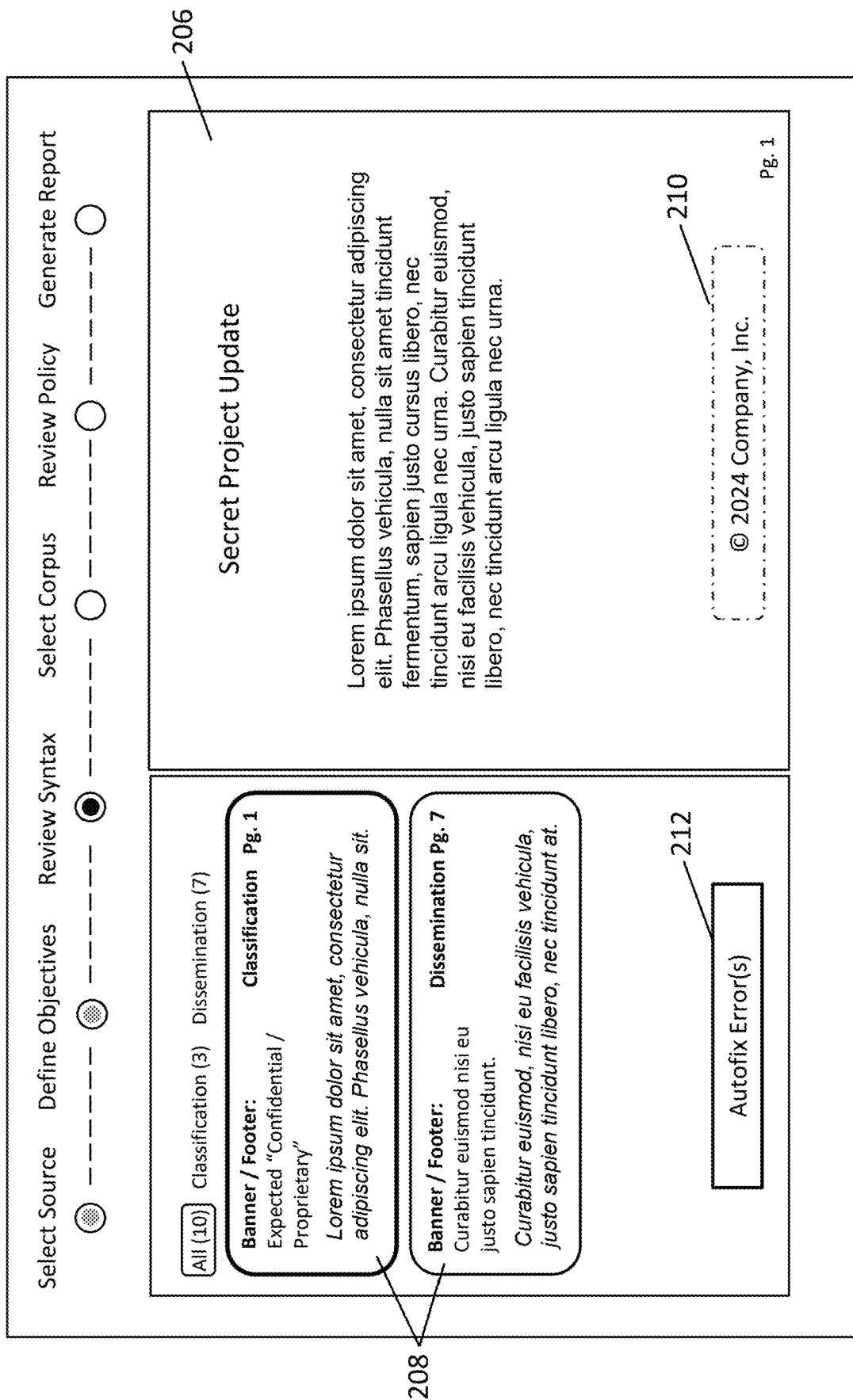
FIG. 2C illustrates a user interface for reviewing syntax in a document, according to an embodiment.

In the syntax review stage, as shown in FIG. 2C, users may interact with the syntax error presenter 208 and the autofix element 212. The syntax error presenter 208 may display identified syntax errors, while the autofix element 212 may allow users to automatically correct these errors.

Figure 2D:
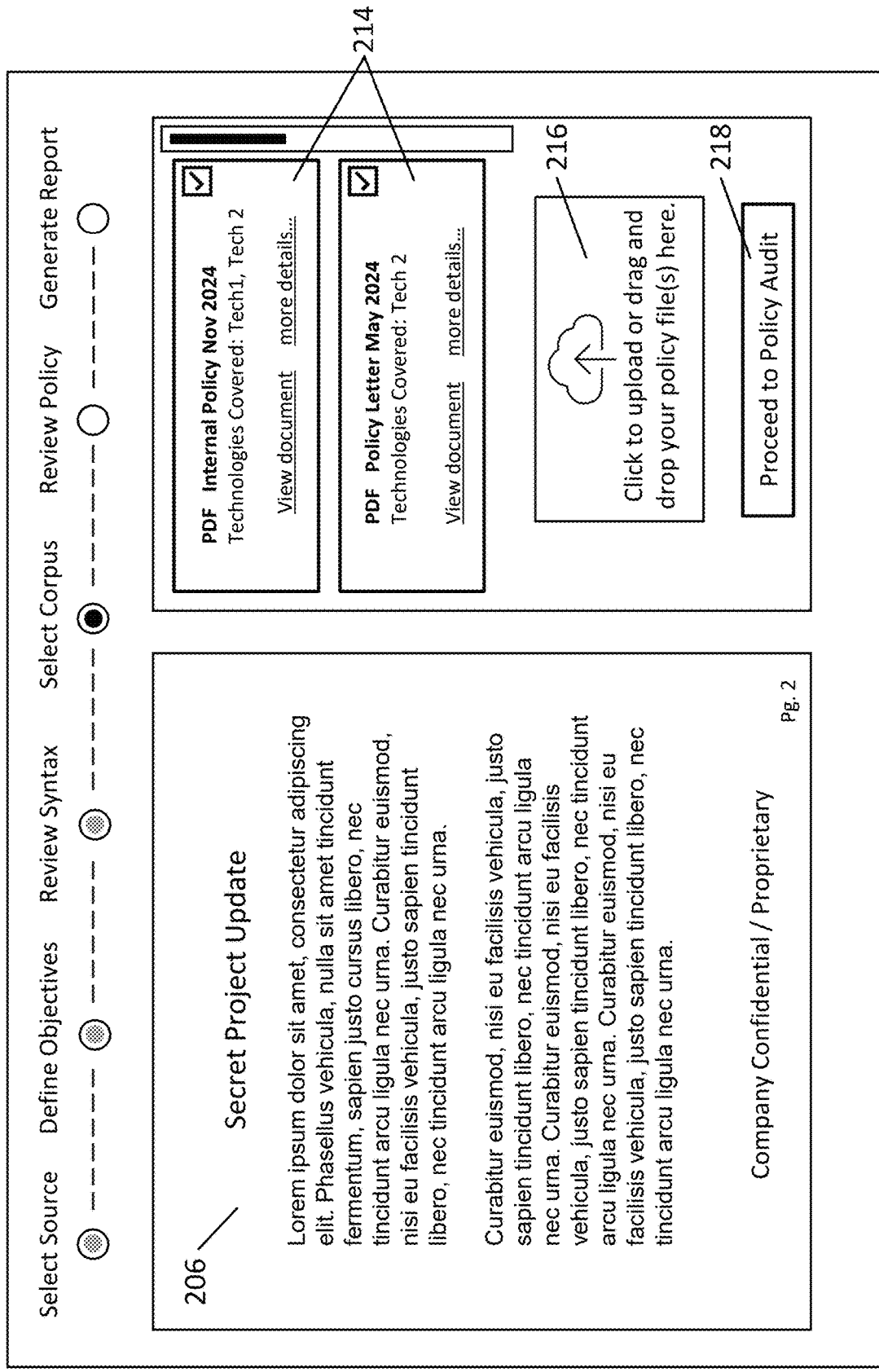
FIG. 2D illustrates a user interface for selecting a corpus in a document review system, according to aspects of the present disclosure.

FIG. 2D shows the corpus selection stage, where users may interact with the corpus selector element 214 and the corpus uploader element 216. These elements may allow users to select existing policy documents or upload new ones. The policy auditor element 218 may then initiate the policy compliance check.

Figure 2F:
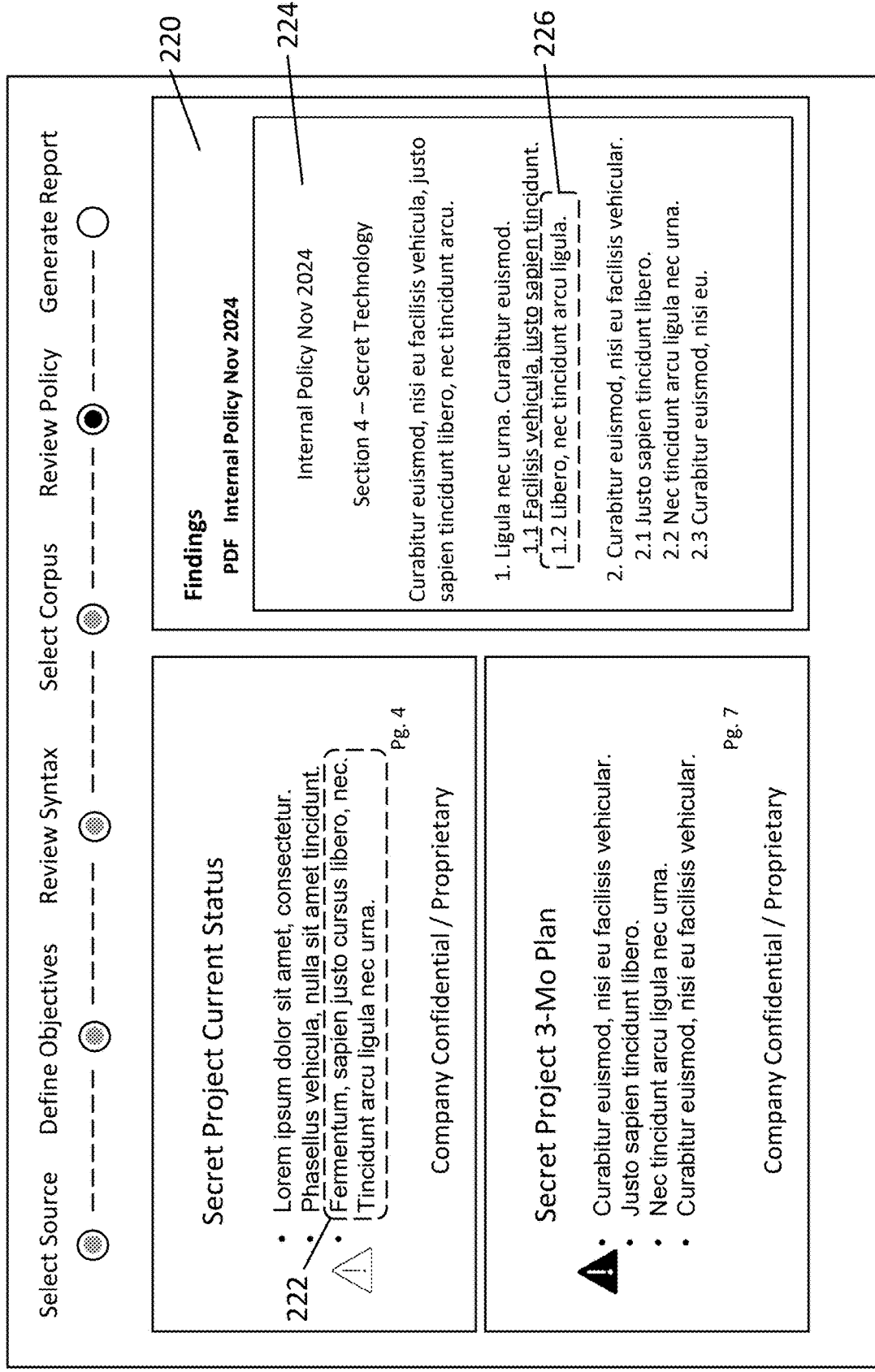
FIG. 2F illustrates a user interface displaying policy findings in a document review system, according to aspects of the present disclosure.

In the policy review stage, illustrated in FIG. 2E and FIG. 2F, users may interact with the finding presenter 220. The finding presenter 220 may display policy-related findings, with finding indicators 222 highlighting specific areas of concern in the document. The policy presenter 224 may show relevant policy documents, with policy indicators 226 emphasizing specific policy sections.

Figure 2G:
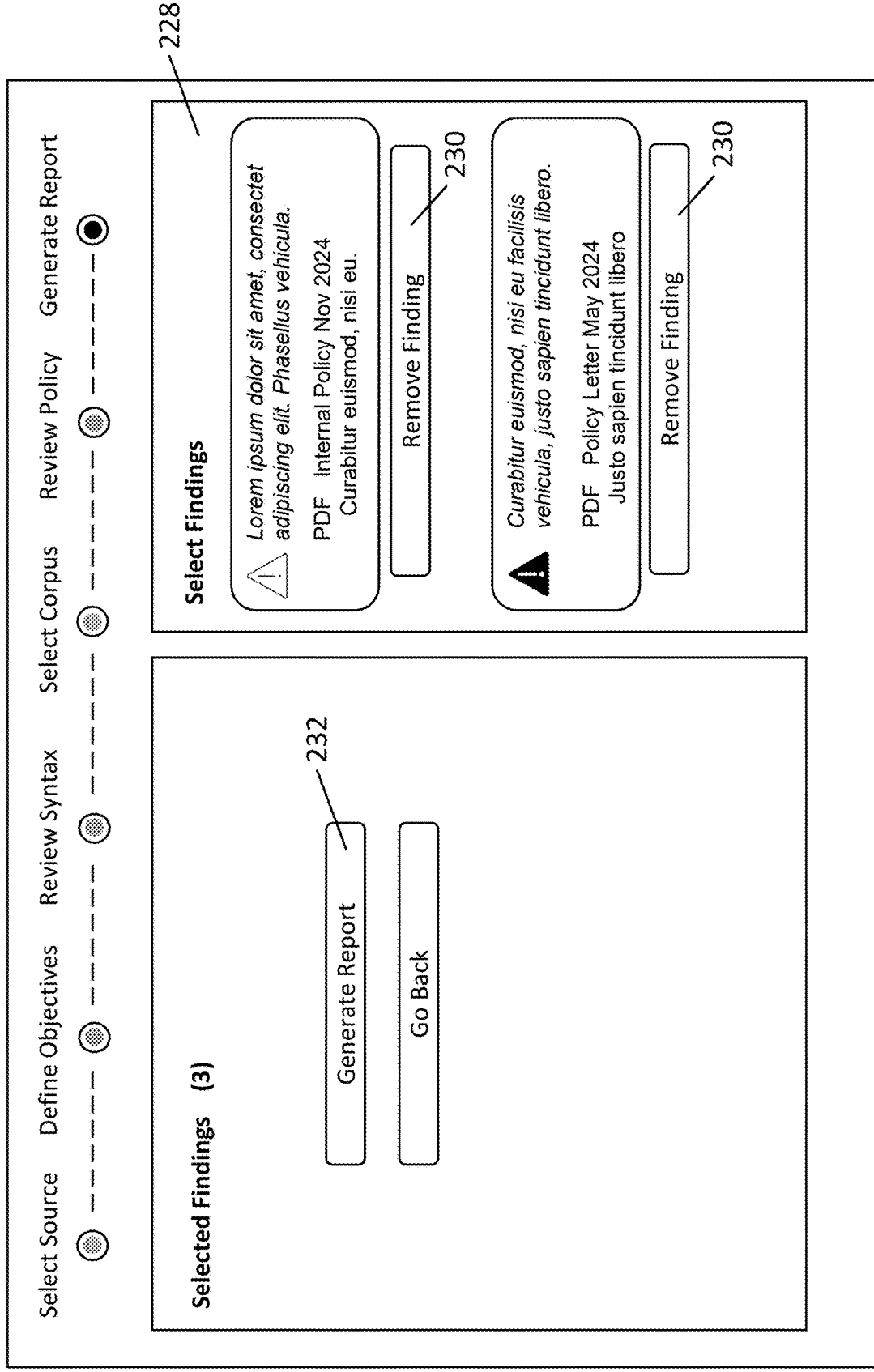
FIG. 2G illustrates a user interface for generating a report in a document review system, according to an embodiment.

The final stage, shown in FIG. 2G, may involve report generation. Users may interact with the finding selector 228 to review findings, use the finding remover element 230 to remove specific findings, and activate the report generator element 232 to create reports based on the review process.

It should be understood that the ordering of stages described herein is exemplary only, and that the stages may be presented in a different order, with two or more stages combined to a single stage, and with any stage split into multiple stages without departing from the scope of the present disclosure.

Each of the components of the document review and approval system may be described in more detail below together with one or more alternative embodiments.

As discussed above, the document review and approval system may include a source selector 102. In some cases, the source selector 102 may be configured to receive one or more source documents. The source selector 102 may provide users with multiple options for inputting documents into the system for review and approval.

FIG. 2A shows a user interface 200 that includes a source selector element 202. In some cases, the source selector element 202 may provide users with the ability to upload files directly from their local computer or select files from the cloud or other networked resource. Users may click on the source selector element 202 to open a file browser dialog, enabling them to navigate a file system and select one or more documents for input to the system.

The source selector element 202 may also support drag-and-drop functionality. Users may drag files from their computer's file explorer and drop them onto the source selector element 202 to initiate the upload process. This feature may provide a quick and intuitive method for adding documents to the system.

In some cases, the source selector 102 may be capable of handling various file formats. For example, the source selector 102 may accept common document types such as PDF files, Microsoft Office documents, EML files, or plain text files. This versatility may allow users to review and approve a wide range of document types within the system.

The source selector 102 may also provide feedback to users during the document upload process. For instance, the source selector element 202 may display progress indicators or confirmation messages to inform users about the status of their uploads.

In some cases, the source selector 102 may allow users to select multiple documents simultaneously. This feature may be particularly useful when users need to review a set of related documents or when processing a batch of files for approval.

The source selector 102 may also include functionality to preview or verify the uploaded documents before proceeding with the review process. This may help users ensure they have selected the correct files before moving on to subsequent stages of the document review and approval workflow.

The document review and approval system may include an objective definer 104. In some cases, the objective definer 104 may be configured to receive user-defined objectives for document review. The objective definer 104 may provide users with a structured way to specify the goals, purposes, and/or relevant parties (e.g., other reviewers or approval authorities) of their document review process.

FIG. 2B shows a user interface 200 that includes objective definer elements 204. The objective definer elements 204 may comprise various input fields, dropdown menus, and selection options that allow users to define their objectives in a clear and organized manner.

In some cases, the objective definer elements 204 may be tailored to specific workflows or applications. For example, in a disclosure workflow, the objective definer elements 204 may include options for selecting intended recipients, specifying an approver and target release date, and indicating the intended disclosure methods.

The objective definer 104 may also accommodate objectives for other types of application processes. For instance, in a grant proposal review workflow, the objective definer elements 204 may include fields for specifying the funding agency, grant type, submission deadline, and key research areas.

In some cases, the objective definer 104 may allow users to input custom objectives or additional information. For example, the objective definer elements 204 may include a text input field for users to provide justification or explain the benefits of their request.

The objective definer 104 may be designed to capture all necessary information to guide the subsequent document review and approval process. By clearly defining objectives at the outset, the objective definer 104 may help ensure that the document review and approval system focuses on the most relevant aspects of syntax compliance and policy adherence.

In some cases, the objective definer 104 may dynamically adjust the available options based on user inputs. For example, selecting a specific type of disclosure in a disclosure workflow may trigger the appearance of additional, relevant objective definer elements 204.

The objective definer 104 may work in conjunction with other components of the document review and approval system. For instance, the objectives defined using the objective definer 104 may inform the selection of relevant policy documents by the corpus selector, or guide the analysis performed by the AI engine.

In some cases, the objective definer element may be implemented as a free text entry field. This approach may provide users with flexibility to express their objectives in their own words. The AI engine may then employ natural language processing (NLP) techniques to analyze the free-form text input and determine the relevant objectives.

Based on this analysis, the AI engine may identify and extract key information from the user's input. This extracted information may be used to infer the appropriate syntax rules and policy considerations for the document review process. For example, if a user mentions "disclosure" in their free text entry, the AI engine may recognize this as a cue to apply specific syntax rules related to classification markings and distribution statements.

The AI engine may also use NLP to identify entities, relationships, and intentions expressed in the free text input. This may allow the system to automatically select relevant policy documents or adjust the review criteria based on the user's stated objectives. For instance, if the user mentions a particular country or organization in their objectives, the AI engine may prioritize policies related to that entity during the review process.

By leveraging NLP capabilities, the objective definer may provide a more intuitive and user-friendly interface while still capturing the necessary information to guide the document review process. This approach may be particularly useful in cases where users are unsure of the specific options or categories that best describe their objectives, or when dealing with unique or complex review scenarios that may not fit neatly into predefined categories.

The document review and approval system may include a syntax auditor 110. FIG. 1 illustrates the syntax auditor 110 as part of the output interfaces of a document review and approval system.

In some cases, the syntax auditor 110 may be configured to identify and facilitate correction of syntax errors in the source documents received through the source selector 102. The syntax auditor 110 may analyze the content and structure of the source documents to detect various types of syntax issues.

FIG. 2C shows a user interface 200 that includes document presenter 206 and a syntax error presenter 208. The document presenter 206 may display the content of a source document being reviewed and may be configured to display content of the source documents alongside identified syntax errors and policy non-compliance issues. The syntax error presenter 208 may display identified syntax errors alongside the content of the source document in the document presenter 206. This side-by-side presentation may allow users to easily locate and understand the context of each syntax error.

In some cases, the syntax error presenter 208 may categorize syntax errors by type. For example, FIG. 2C shows two sections in the syntax error presenter 208: one related to "Classification" and another related to "Dissemination." This categorization may help users quickly identify and address specific types of syntax issues.

The user interface 200 may also include a syntax error indicator 210 within the document content area of the document presenter 206. The syntax error indicator 210 may highlight or otherwise visually mark the specific portions of the document where syntax errors (i.e., the syntax errors in the syntax error presenter 208) have been identified. This feature may provide users with a clear visual representation of where errors occur within the context of the full document.

In some cases, the syntax auditor 110 may be configured to automatically correct identified syntax errors in the source documents. The user interface 200 may include an autofix element 212, as shown in FIG. 2C. The autofix element 212 may allow users to initiate automatic correction of identified syntax errors.

The syntax auditor 110 may be capable of making corrections directly within the source document itself. For example, the syntax auditor 110 may modify a PDF, Google Document, or Microsoft Office file to correct syntax errors. This may involve changing actual text, adjusting formatting, or modifying document properties to ensure compliance with syntax rules.

In some aspects, the syntax auditor 110 may automatically correct identified syntax errors while simultaneously marking the corrected areas in the document content area with syntax error indicators 210. This approach may allow users to review the automated corrections before finalizing the document.

The syntax auditor 110 may apply corrections to the source document based on predefined rules or AI-generated suggestions. As it makes these corrections, it may insert syntax error indicators 210 at the locations of the corrected errors. These indicators may take various forms, such as highlighted text, underlined text, or marginal notes, depending on the document format and user preferences.

Users may interact with the syntax error indicators 210 to review the automated corrections. In some cases, hovering over or clicking on a syntax error indicator 210 may display information about the original error and the applied correction. This information may include the type of error, the original text, and the corrected text.

The user interface 200 may provide options for users to accept, decline, or revise each automatically corrected syntax error. Users may be able to cycle through the corrections using keyboard shortcuts or navigation buttons within the interface.

In some implementations, the syntax auditor 110 may track user decisions on automated corrections. This data may be used to improve future automated correction suggestions and to generate reports on common syntax issues within an organization.

The system may also provide a summary view of all automated corrections, allowing users to quickly review and batch process multiple changes. This feature may be particularly useful for documents with numerous syntax errors or for users who prefer to review all changes at once.

By combining automated correction with user review, the syntax auditor 110 may streamline the process of fixing syntax errors while maintaining user control over the final document content. This approach may help balance efficiency with accuracy in document review and approval workflows.

In some cases, users may be able to configure a set of syntax rules to be applied to a document. These rules may be predefined, automatically selected by the AI engine 108 based on the objectives defined through the objective definer 104, or generated by the AI engine 108 based on the defined objectives.

The syntax auditor 110 may address various types of common syntax issues. For example:

1. Disclosure markings: The syntax auditor 110 may check for proper placement, formatting, and consistency of disclosure markings throughout the document.
2. Page numbering: The syntax auditor 110 may ensure that page numbers are present, correctly formatted, and sequential.
3. Headers and footers: The syntax auditor 110 may verify that headers and footers contain required information and are consistently formatted across all pages.
4. Paragraph numbering: The syntax auditor 110 may check for proper numbering or lettering of paragraphs and subparagraphs.
5. Font and formatting: The syntax auditor 110 may ensure that the document uses approved fonts, font sizes, and formatting styles.
6. Distribution statements: The syntax auditor 110 may verify that appropriate distribution statements are included and properly formatted.

In some cases, the syntax auditor 110 may work in conjunction with the AI engine 108 to provide context-aware syntax checking. For example, the AI engine 108 may analyze the content of the document and the objectives defined through the objective definer 104 to determine which syntax rules are most relevant for a particular document review.

The syntax auditor 110 may also provide explanations for identified syntax errors. These explanations may help users understand why a particular syntax issue needs to be addressed and how to correct it properly.

By combining automated syntax checking, clear error presentation, and the ability to automatically correct errors, the syntax auditor 110 may significantly streamline the process of ensuring document compliance with syntax requirements.

The document review and approval system may include a corpus selector 106. FIG. 1 illustrates the corpus selector 106 as part of the input interfaces of a document review and approval system.

In some cases, the corpus selector 106 may be configured to receive one or more policy documents. The corpus selector 106 may provide users with multiple options for inputting, searching for, and selecting relevant policy documents to be used in the review process.

FIG. 2D shows a user interface 200 that includes a corpus selector element 214 and a corpus uploader element 216. The corpus selector element 214 may display a list of policy documents relevant to the review process. The corpus uploader element 216 may allow users to upload additional policy files by clicking or dragging and dropping files.

In some cases, the document review and approval system may include a search functionality that permits users to identify documents that they should include in the policy corpus. The search functionality may support semantic search across data by chunking and creating embeddings that are then stored in a vector database.

The corpus selector 106 may be configured to semantically search across a database of policy documents to identify relevant policy documents based on the user-defined objectives. In some cases, users may perform text-based searches and/or search by uploading one or more document(s).

When users search by uploading documents, the document review and approval system may allow users to view both the uploaded document(s) and the referenced results side-by-side. This feature may assist users in comparing and selecting relevant policy documents for their review process.

The document review and approval system may return search results with relevant information including direct links to specific documents, pages, and portions, along with extracted metadata. This information may help users quickly identify the most pertinent policy documents for their review objectives.

In some cases, the document review and approval system may identify semantically related documents to assist the user with defining a relevant and comprehensive policy corpus. This feature may leverage the AI engine to analyze the content of policy documents and identify relationships between them.

The corpus selector 106 may work in conjunction with other components of the document review and approval system. For example, the AI engine may recommend corpus documents based on policies related to the objective(s) previously defined by the user using the objective definer 104 and/or the source document(s) uploaded through the source selector 102.

The corpus of policy documents may include various types of documents relevant to the review process. These may include, but are not limited to, official policy statements, regulatory guidelines, internal procedures, previous approval documents, and relevant legal texts. By allowing users to select and upload a diverse range of policy documents, the corpus selector 106 may enable a comprehensive and context-specific review process.

The document review and approval system may include an AI engine 108. FIG. 1 illustrates the AI engine 108 as a component of a document review and approval system.

In some cases, the AI engine 108 may be configured to process the source documents received through the source selector 102, user-defined objectives input via the objective definer 104, and policy documents selected using the corpus selector 106. The AI engine 108 may analyze these inputs to identify potential syntax errors, policy non-compliance issues, and generate relevant outputs for the document review process.

The AI engine 108 may include a NLP component and a large language model (LLM). The NLP component may enable the AI engine 108 to understand and interpret the content of source documents, user objectives, and policy documents. The LLM may allow the AI engine 108 to process natural language inputs and generate natural language outputs.

In some cases, the AI engine 108 may apply machine learning techniques to improve its performance over time. For example, the AI engine 108 may learn from previous document reviews to better identify common syntax errors or policy violations in future reviews.

The AI engine 108 may use its NLP capabilities to analyze the content of source documents and compare it against relevant policy documents. This analysis may help identify potential non-compliance issues that may not be apparent through simple keyword matching.

In some cases, the LLM within the AI engine 108 may be configured to generate explanations for identified syntax errors and policy non-compliance issues. These explanations may provide users with clear, context-specific information about why certain parts of a document may not comply with syntax rules or policy guidelines.

For example, if the AI engine 108 identifies a syntax error related to classification markings, the LLM may generate an explanation such as: "The classification marking on page 3 does not comply with the required format specified in Policy Document X. The correct format should be [example of correct format]."

Similarly, for policy non-compliance issues, the AI engine 108 may provide detailed explanations. For instance: "The technology described in paragraph 2 on page 5 may not be suitable for external disclosure according to Policy Document Z, which restricts sharing of this specific technology with external parties."

In some cases, the user interface 200 may allow users to select which LLM the AI engine 108 should use for a particular document review process. This feature may enable users to choose an LLM that is best suited for their specific review needs or that complies with any relevant organizational or security requirements.

The AI engine 108 may work in conjunction with other components of the document review and approval system. For example, the AI engine 108 may use the objectives defined through the objective definer elements 204 to guide its analysis of source documents and policy documents. Similarly, the AI engine 108 may leverage the corpus of policy documents selected through the corpus selector element 214 and corpus uploader element 216 to inform its policy compliance checks.

The document review and approval system may include a policy auditor 112. FIG. 1 illustrates the policy auditor 112 as part of the output interfaces of a document review and approval system.

In some cases, the policy auditor 112 may be configured to identify non-compliance issues with policies. The policy auditor 112 may analyze the content of source documents received through the source selector 102 and compare it against policy documents selected using the corpus selector 106.

FIG. 2D shows a user interface 200 that includes a policy auditor element 218. The policy auditor element 218 may allow users to initiate the policy compliance check after selecting or uploading relevant policy documents through the corpus selector element 214 and corpus uploader element 216.

The policy auditor 112 may leverage the AI engine 108 to perform sophisticated analysis of document content. In some cases, the policy auditor 112 may be configured to identify non-compliance issues by comparing content of the source documents against the policy documents using natural language processing. This approach may enable the policy auditor 112 to detect both explicit and implicit policy violations.

For example, the policy auditor 112 may identify explicit violations such as the presence of specific prohibited terms or phrases. Additionally, the policy auditor 112 may detect implicit violations by inferring policy non-compliance through a deep understanding of the content. For instance, the policy auditor 112 may recognize that a description of a particular technology, even if not explicitly named, violates a policy restricting the disclosure of certain capabilities.

FIG. 2E illustrates a user interface 200 that includes a finding presenter 220. The finding presenter 220 may display policy-related findings for the document being reviewed. In some cases, the finding presenter 220 may organize findings by page numbers or other relevant categories.

The user interface 200 may also include finding indicators 222. The finding indicators 222 may appear as warning symbols or other visual cues next to specific highlighted content within the document that corresponds to the findings in the finding presenter 220.

FIG. 2F shows a user interface 200 that includes a policy presenter 224. The policy presenter 224 may display the relevant policy document corresponding to the findings. Within the policy presenter 224, a policy indicator 226 may be visible, which may emphasize specific policy sections or clauses pertinent to the document review.

In some cases, the system may allow users to take arbitrary actions on findings. These actions may include removing a finding, adding comments to a finding, or editing and refining a finding using the AI engine 108. This functionality may provide users with flexibility in managing and responding to identified policy non-compliance issues.

In some cases, the document review and approval system may allow users to create new findings by interacting directly with the document presenter 206. Users may draw selection boxes around arbitrary portions of text within the document being reviewed. This feature may provide a flexible way for users to identify and analyze specific sections of a document that may require closer examination or raise potential compliance concerns.

After selecting a portion of text, users may have multiple options for creating a new finding. In some aspects, users may input custom text to describe the potential issue or concern related to the selected text. This user-defined text may be associated with the selected portion of the document and added as a new finding in the finding presenter 220.

Alternatively, users may leverage the AI engine 108 and semantic search capabilities to analyze the selected text for potential policy compliance issues. In this case, the system may automatically search the corpus of policy documents for relevant policies that may apply to the selected text. The AI engine 108 may then generate a finding based on its analysis, which may include potential policy violations or areas of concern.

The semantic search functionality may allow for a more nuanced and context-aware analysis of the selected text. For example, if a user selects a paragraph describing a technical capability, the AI engine 108 may search for policies related to the disclosure of that specific type of technology, even if the exact terms are not used in the policy documents.

In some cases, the system may present users with a combination of AI-generated findings and the option to add custom text. This approach may allow users to benefit from the AI's analysis while also incorporating their own expertise and insights.

The newly created findings, whether user-defined or AI-generated, may be added to the finding presenter 220 and associated with the corresponding portion of the document. Finding indicators 222 may be automatically added to the document presenter 206 to visually mark the location of these new findings within the document.

Users may have the ability to edit, refine, or remove these newly created findings using the same mechanisms available for system-generated findings. This may include using the finding remover element 230 or leveraging the AI engine 108 to further analyze or refine the finding.

By allowing users to create custom findings and leverage AI-powered analysis for selected text, the document review and approval system may provide a more interactive and thorough review process. This feature may enable reviewers to identify and address potential compliance issues that may not have been automatically detected by the system's initial analysis.

The policy auditor 112 may work in conjunction with other components of the document review and approval system. For example, the policy auditor 112 may use the objectives defined through the objective definer elements 204 to guide its analysis and prioritize certain types of policy compliance checks.

By combining advanced NLP capabilities with a comprehensive policy corpus and user-friendly interfaces, the policy auditor 112 may provide a thorough and nuanced assessment of document compliance with relevant policies.

The document review and approval system may include a reporter 114. FIG. 1 illustrates the reporter 114 as part of the output interfaces of a document review and approval system.

In some cases, the reporter 114 may be configured to generate reports based on findings of the syntax auditor 110 and/or the policy auditor 112. The reporter 114 may compile the results of the document review process into various types of reports, summaries, and memorandums.

FIG. 2G shows a user interface 200 that includes elements related to the reporting functionality. The user interface 200 may include a finding selector 228, which may display individual findings related to policy reviews. Each finding in the finding selector 228 may be presented in a box with descriptive text and associated document information.

In some cases, the user interface 200 may include a finding remover element 230. The finding remover element 230 may be a button and allow users to remove specific findings from consideration before generating a report.

The user interface 200 may also include a report generator element 232. The report generator element 232 may be a button, and selecting the report generator element 232 may trigger the creation of one or more reports related to the document review process.

In some cases, the reporter 114 may be configured to generate a summary memorandum based on the findings of the policy auditor 112. This summary memorandum may provide a concise overview of the policy compliance status of the reviewed document. The summary memorandum may include:

1. An executive summary of the review process
2. A list of identified policy compliance issues
3. Recommendations for addressing non-compliance issues
4. References to relevant policy documents The reporter 114 may generate different types of reports depending on the user's needs and the specific review process. For example:

1. Detailed Compliance Report: This report may provide an in-depth analysis of all syntax and policy compliance issues identified during the review process. The report may include specific references to the source document, relevant policy documents, and explanations for each finding.
2. Executive Summary: This report may offer a high-level overview of the review process, highlighting key findings and recommendations. The executive summary may be suitable for stakeholders who need a quick understanding of the document's compliance status.
3. Approval Workflow Report: This report may document the steps taken in the review process, including who reviewed the document, what findings were identified, and how they were addressed. This report may be useful for maintaining an audit trail of the approval process.
4. Comparative Analysis Report: If multiple versions of a document are reviewed, the reporter 114 may generate a report comparing the compliance status of different versions, highlighting improvements or new issues that arise between versions.

In some cases, the reporter 114 may enable users to share revised documents, findings, and stamp or mark source documents as approved in accordance with defined approver workflows. The reporter 114 may generate approval stamps or markings that can be applied directly to the source documents, indicating their review status and approval.

The reporter 114 may work in conjunction with other components of the document review and approval system. For example, the reporter 114 may use the objectives defined through the objective definer 104 to tailor the content and format of the generated reports. Similarly, the reporter 114 may leverage the AI engine 108 to generate natural language summaries and explanations within the reports.

By providing a range of reporting options and the ability to customize report content based on user needs, the reporter 114 may facilitate effective communication of review results and support informed decision-making in the document approval process.

The document review and approval system may integrate various components to perform comprehensive document review and approval processes. FIG. 1 illustrates a block diagram of the document review and approval system, showing the interconnected components that work together to facilitate the review workflow.

In some cases, the workflow may begin with the source selector 102. The source selector 102 may allow users to input one or more documents for review. Once the documents are uploaded, the objective definer 104 may enable users to specify the goals and parameters of the review process.

The corpus selector 106 may then allow users to select relevant policy documents against which the source documents will be evaluated. In some cases, the corpus selector 106 may leverage the AI engine 108 to recommend relevant policy documents based on the defined objectives and the content of the source documents.

The AI engine 108 may process the inputs from the source selector 102, objective definer 104, and corpus selector 106. The AI engine 108 may analyze the source documents, interpret the user-defined objectives, and examine the selected policy documents to identify potential issues or areas of concern.

Following the analysis by the AI engine 108, the syntax auditor 110 may identify and facilitate correction of syntax errors in the source documents. The policy auditor 112 may then identify non-compliance issues with policies. Finally, the reporter 114 may generate reports based on the findings of the syntax auditor 110 and policy auditor 112.

In some cases, the document review and approval system may allow users to define rules based on plain English to be applied to a document that are general in nature. These user-defined rules may be processed by the AI engine 108 and incorporated into the syntax auditor 110 and policy auditor 112 for document evaluation.

The document review and approval system may support workflows involving multiple users based on their respective responsibilities in a review and approval process. For example, one user may initiate the review process by uploading documents and defining objectives, while another user with different expertise may select relevant policy documents and review the findings.

In some cases, the system may create an 'expert network' of people responsible for approvals or topics based on previously approved documents by extracting metadata. The AI engine 108 may analyze the metadata from previously approved documents to identify patterns and relationships between document types, topics, and approvers.

The system may assign others to review findings and documents by using the AI engine 108 to identify who experts might be within a given organization. For example, if a document contains technical information about a specific subject, the AI engine 108 may recommend reviewers who have previously approved similar documents or who have relevant expertise based on their profile information.

The document review and approval system may include access controls associated with documents and rules. These access controls may ensure that only authorized users can view, edit, or approve certain documents or apply specific rules during the review process.

A complete review process may involve multiple stages and users. For instance:

1. A requester may upload a document using the source selector 102 and define objectives using the objective definer 104.
2. The AI engine 108 may recommend relevant policy documents, which a policy expert may review and select using the corpus selector 106.
3. The syntax auditor 110 may identify syntax errors, which the requester may correct using the autofix element 212.
4. The policy auditor 112 may identify policy compliance issues, which a subject matter expert may review using the finding presenter 220.
5. The subject matter expert may use the finding remover element 230 to remove any false positives or resolved issues.
6. Finally, an approver may use the report generator element 232 to generate a final report summarizing the review process and findings.

Throughout this process, the user interface 200 may guide users through each stage, ensuring a streamlined and comprehensive review workflow. By integrating these various components and supporting multi-user workflows, the document review and approval system may provide a flexible and powerful tool for ensuring document compliance with both syntax and policy requirements.

The use of the term "exemplary" in this disclosure may refer to "example" or "illustrative" and may not imply any preference or requirement. The use of the singular form of any word may include the plural and vice versa. Words importing a particular gender may include every other gender. The use of "or" may not be exclusive and may include "and/or" unless the context clearly dictates otherwise. The phrases "in one embodiment," "in some embodiments," "in various embodiments," "in other embodiments," and the like may all refer to one or more of the same or different embodiments. The term "based on" may mean "based at least in part on." The term "may" may be used to describe optional features or functions. Any dimensions, measurements, or quantities given may be approximate and may vary within normal operational ranges. The use of relative terms such as "above," "below," "upper," "lower," "horizontal," "vertical," "top," "bottom," "side," "left," and "right" may be used to describe the relationship of one element to another and may not imply any particular orientation or direction unless specifically stated. The use of "including," "comprising," "having," and variations thereof may mean "including, but not limited to" unless otherwise specified. Any sequence of steps or operations described may be varied or performed in a different order unless otherwise specified. Any numerical range recited may include all values from the lower value to the upper value and all possible sub-ranges in between. The term "about" or "approximately" may mean within an acceptable error range for the particular value as determined by one of ordinary skill in the art, which may depend in part on how the value is measured or determined.

A number of implementations have been described. Nevertheless, it will be understood that various modifications may be made without departing from the spirit and scope of the disclosure. Accordingly, other implementations are within the scope of the following claims.

The invention claimed is:

1. A document review and approval system, comprising:
   a user interface comprising:
      a source selector component that receives one or more source documents;
      an objective definer component that receives one or more user-defined objectives for document review; and
      a corpus selector component that receives one or more policy documents;
   an artificial intelligence engine that analyzes the source documents, interprets the user-defined objectives, and examines the one or more policy documents to identify potential issues or areas of concern in the source documents; and
   output interfaces comprising:
      a syntax auditor component that identifies and facilitates correction of one or more syntax errors in the source documents based on output from the artificial intelligence engine;
      a policy auditor component that identifies one or more non-compliance issues with the one or more policy documents based on output from the artificial intelligence engine; and
      a reporter component that generates one or more reports based on findings of the syntax and/or policy auditors.

2. The document review and approval system of claim 1, wherein the syntax auditor component automatically corrects the one or more identified syntax errors in the source documents.

3. The document review and approval system of claim 1, wherein the policy auditor component identifies the one or more non-compliance issues based on the artificial intelligence engine comparing content of the source documents against the policy documents using natural language processing.

4. The document review and approval system of claim 1, wherein the reporter component generates a summary memorandum based on the findings of the policy auditor component.

5. The document review and approval system of claim 1, wherein the reporter component:
   customizes report content based on the one or more user-defined objectives received through the objective definer; and
   incorporates natural language summaries and explanations generated by the artificial intelligence engine.

6. The document review and approval system of claim 1, wherein the corpus selector component semantically searches across a database of policy documents to identify one or more relevant policy documents based on the user-defined objectives.

7. The document review and approval system of claim 1, wherein the user interface further comprises a document presenter component that displays content of the one or more source documents alongside identified syntax errors and policy non-compliance issues.

8. The document review and approval system of claim 7, wherein the document presenter component highlights portions of the one or more source documents corresponding to identified syntax errors and policy non-compliance issues.

9. The document review and approval system of claim 1, wherein the artificial intelligence engine comprises a large language model that processes natural language inputs and generates natural language outputs.

10. The document review and approval system of claim 9, wherein the large language model generates explanations for identified syntax errors and policy non-compliance issues.

11. The document review and approval system of claim 1, wherein the user interface further comprises a finding presenter component that displays one or more policy-related findings for the source documents.

12. The document review and approval system of claim 1, wherein the corpus selector component allows users to upload additional policy documents.

13. The document review and approval system of claim 1, wherein the artificial intelligence engine recommends one or more relevant policy documents based on the content of the one or more source documents and the one or more user-defined objectives.

14. The document review and approval system of claim 1, wherein the artificial intelligence engine creates an expert network by analyzing metadata from previously approved documents to identify patterns and relationships between document types, topics, and approvers.

15. The document review and approval system of claim 1, wherein the system supports workflows involving multiple users based on their respective responsibilities in a review and approval process.

16. The document review and approval system of claim 1, wherein the reporter component generates approval stamps or markings and applies apply them directly to the one or more source documents to indicate their review status and/or approval.

17. The document review and approval system of claim 1, wherein the user interface is guides users through multiple stages of a review process, including selecting source documents, defining objectives, reviewing syntax, selecting a corpus, reviewing policy compliance, and generating reports.

18. The document review and approval system of claim 1, wherein the user interface further comprises a rule creation element that allows users to define one or more rules in plain language, and wherein the artificial intelligence engine processes these one or more user-defined rules and incorporates them into one or more of the syntax auditor and policy auditor for document evaluation.

19. The document review and approval system of claim 1, wherein the user interface further comprises a finding presenter component that displays policy-related findings for the one or more source documents, the finding presenter including a finding selector element that allows users to select one or more specific findings for inclusion in the one or more reports.

20. The document review and approval system of claim 19, wherein the finding presenter component further includes a finding remover element allows users to remove selected findings from consideration before the reporter generates the one or more reports.

\* \* \* \* \*